Feb. 19, 1946.   R. A. LAW   2,395,280
PORTABLE AUXILIARY BRAKE CONTROLS
Filed Jan. 19, 1944

INVENTOR
Richard A. Law

Patented Feb. 19, 1946

2,395,280

UNITED STATES PATENT OFFICE 2,395,280

PORTABLE AUXILIARY BRAKE CONTROL

Richard A. Law, Richmond Hill, N. Y.

Application January 19, 1944, Serial No. 518,831

2 Claims. (Cl. 180—77)

My invention relates to dual foot brake controls for automobiles and in more detail describes a portable and removable auxiliary mechanism for controlling the use of the foot brake of an automobile.

Auxiliary or dual brake controls used at present are permanent car fixtures of a complex and costly nature and require considerable time and effort for installation. Therefore it is impractical to auxiliary brake control equip privately owned vehicles and safe driving instruction can only be given in special instruction cars.

To improve this situation and permit a learner to be taught driving safely in any car I have invented a simple, portable dual brake control which can be easily and quickly installed in and removed from a car without marking or disfiguring the car in any way.

I accomplish these and other objects by clamping one universal end of my dual brake control bar to the brake pedal stem and the other universal end to an arm extending from an enlarged base. My objects can be accomplished also by clamping to the drive wheel stem casing a bearing carrying a rotatable shaft provided with two extending arms, one arm adjacent and below the brake pedal and the other arm provided with an enlarged end portion positioned to be conveniently operated by the driving instructor, and a clamped element on the brake pedal stem below and adjacent the end of the first arm so that when the shaft is rotated by the instructor's stepping on the enlarged part of the second arm of the brake pedal and brake operated by the pressure of the first arm on the element clamped to the brake stem.

Figure 1:
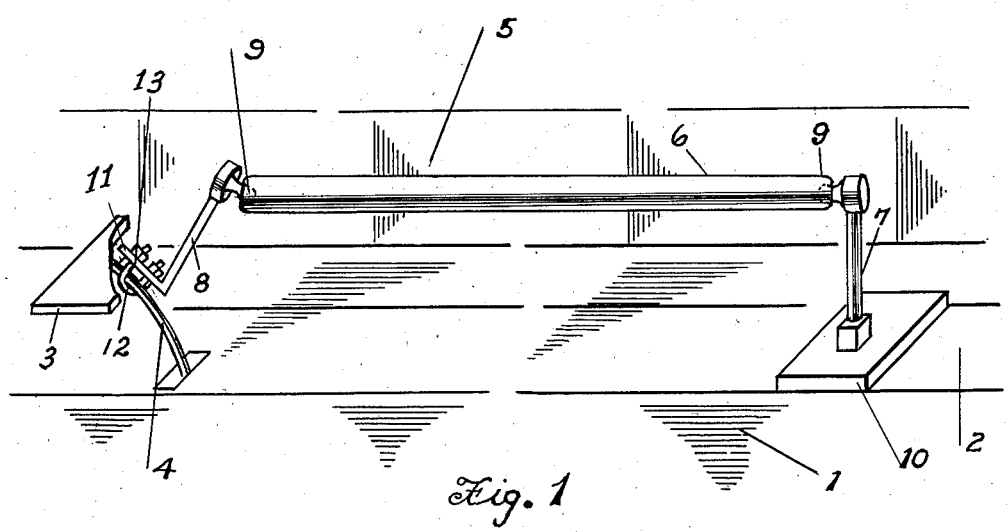
Figure 2:
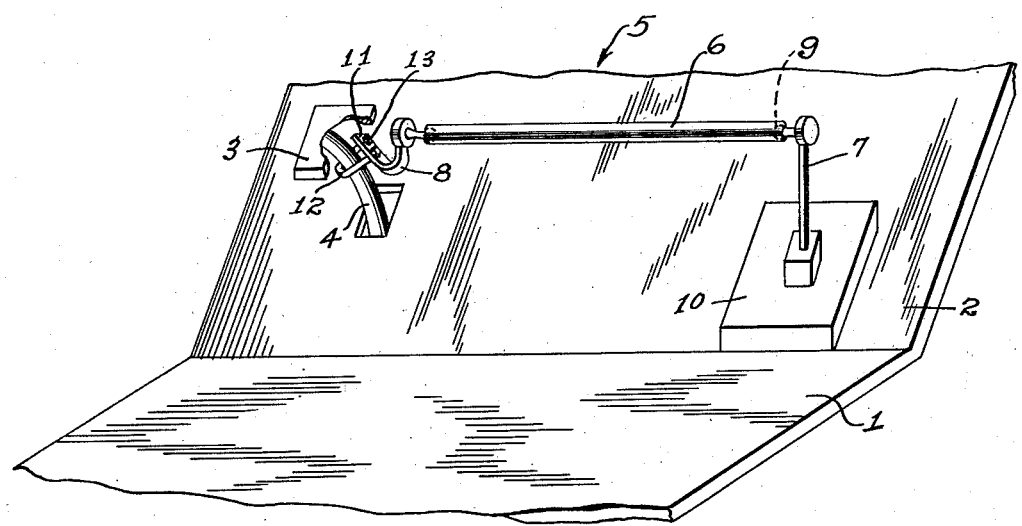

Further and more specific details and objects of my invention will appear, be described and shown in the accompanying drawing in which Figure 1 is a perspective view of my portable auxiliary brake control attached to the foot brake of a car and Figure 2 is a perspective view of my auxiliary brake secured in position in a car.

In the drawing and in the specification corresponding numerals are used to designate like objects and elements. In the drawing in Figure 1 the parts of the car shown are the horizontal floor boards 1, sloping floor boards 2, brake pedal 3 and brake pedal stem 4.

My invention 5 is formed with a long tube or bar 6 which is supported by the arms 7 and 8 by means of universal joints 9 which are formed between the ends of the bar and the arms. The arm 7 is firmly secured in an extending position to the base plate 10 which usually rests on the sloping floor boards of the car and is held from movement by the intersection of the sloping and flat floor boards.

The end of the arm 8 removed from the universal joint 9 terminates in the angled section 11 which is firmly secured to the brake pedal stem 4 adjacent the brake pedal 3 by means of the U bolt clamp 12 and nuts 13. As the bar 6 is comparatively long, extending from the vicinity of the brake pedal across the car toward the right and in front of the instructor and is universally held in a raised position by the arms but with the arm 7 fixed from movement, any downward force applied to the bar will cause it to move downward pivoting about the universal end of the arm 7 and carrying the braking elements downward into a functioning position. When the pressure is released from the bar the braking elements and the bar are returned to their normal positions by means of the springs (not shown) of the braking element.

The auxiliary brake bar apparatus 5 is attached to the car by setting the base 10 in its proper position on the floor boards and clamping the angled arm end section 11 to the brake stem by means of the U bolt elements.

I claim:

1. In combination with two floor boards of an automobile positioned together so as to form an angle therebetween, an auxiliary control for a pedal used in the driving of the automobile comprised of a base plate, an arm extending from the base plate and a control bar attached both to said arm and to the pedal, the base plate positioned on one of the floor boards and one of its edges resting in the joint formed by the intersection between the two boards so as to hold the base plate from movement.

2. In combination with two floor boards of an automobile positioned together so as to form an angle therebetween, an auxiliary control for a pedal used in the driving of the automobile comprised of a base plate, an arm extending from the base plate and a control bar attached both to said arm and to the pedal, the base plate large enough in its area of contact with the floor boards to supply a firm bearing for carrying one end of the control bar and positioned on one of the floor boards and one of its edges resting in the joint formed by the intersection between the two boards so as to hold the base plate from movement.

RICHARD A. LAW.